United States Patent [19]
Lee

[11] Patent Number: 5,921,218
[45] Date of Patent: Jul. 13, 1999

[54] METHOD AND DEVICE FOR PREVENTING ENGINE KNOCK DURING ENGINE OFF-IDLE

[75] Inventor: Sae-Young Lee, Kyungki-Do, Rep. of Korea

[73] Assignee: Hyundai Motor Company, Ltd., Seoul, Rep. of Korea

[21] Appl. No.: 08/955,302

[22] Filed: Oct. 21, 1997

Related U.S. Application Data

[63] Continuation-in-part of application No. 08/877,658, Jun. 17, 1997.

[51] Int. Cl.[6] .............................. F02D 9/00; F02D 11/00
[52] U.S. Cl. ...................................... 123/396; 123/339.23
[58] Field of Search ........................ 123/339.1, 339.23, 123/396, 399, 400

[56] References Cited

U.S. PATENT DOCUMENTS

| | | | |
|---|---|---|---|
| 5,211,148 | 5/1993 | Furuya et al. ........................... | 123/396 |
| 5,305,722 | 4/1994 | Fukui ...................................... | 123/425 |
| 5,343,840 | 9/1994 | Wataya et al. ................. | 123/339.23 X |
| 5,404,854 | 4/1995 | Kamabora et al. ..................... | 123/425 |
| 5,778,853 | 7/1998 | Saito ...................................... | 123/396 |

*Primary Examiner*—Tony M. Argenbright

[57] ABSTRACT

A device for preventing knock in an engine includes a throttle valve controlling air flow to a combustion chamber of said engine via a first air flow passage. A first throttle assembly is selectively connected to a second throttle assembly, and the second throttle assembly is operationally connected to the throttle valve. The first throttle assembly receives a mechanical input to, in turn, control the throttle valve. A solenoid valve selectively controls an actuator according to whether the solenoid valve is in an off state or in an on state. When the solenoid valve is in an off state, the actuator moves the first throttle assembly out of a connection with the second throttle assembly in the off state of the actuator. When the solenoid valve is in the on state, the actuator moves the first throttle assembly into a connection with the second throttle assembly. The device further includes a sensor for detecting if the engine is or is not in an off-idle state, and a controller which receives output from the sensor and controls the solenoid valve based on the output from the sensor. The controller places the solenoid valve into its off state when the sensor detects the off-idle state. The device additionally includes an idle speed actuator system controlling air flow to the combustion chamber of the engine via a second air flow passage.

24 Claims, 1 Drawing Sheet

5,921,218

METHOD AND DEVICE FOR PREVENTING ENGINE KNOCK DURING ENGINE OFF-IDLE

This application is a continuation-in-part of application Ser. No. 08/877,658, filed on Jun. 17, 1997, the entire contents of which are hereby incorporated by reference.

BACKGROUND OF THE INVENTION

1. Field of the Invention

The present invention relates to a method and device for preventing engine knock during engine off-idle and, more particularly, to a method and device for preventing engine knock during engine off-idle in which the opening and closing of a throttle valve is controlled so as to effectively mix fuel and air.

2. Description of Related Art

Various types of knock-preventing devices for a vehicle engine are known in the art. These devices are generally controlled as part of an engine management system (EMS). The EMS generally includes an idle speed actuator (hereinafter "ISA") system. The ISA system is operated by an electronic control unit (hereinafter "ECU") to maintain a best target engine speed while the engine idles. For example, the ECU will increase the target engine speed when the load on the idling engine increases, such as during operation of the air conditioning system.

FIG. 1 is a diagrammatic top plane view of a conventional ISA unit 50. As shown in FIG. 1, such a conventional ISA unit 50 is located in an airflow path that is connected to a throttle body 62 at one end thereof and connected to a surge tank 58 at the other end thereof. The throttle body 62 defines another airflow path and is provided with a throttle valve assembly 52, including throttle valve 52a, and an axle cable 56 connected to throttle valve assembly 52 for opening and closing the throttle valve 52a.

In operation, during an idle driving state, the throttle valve 52a closes the airflow path in throttle body 62 and fresh air is supplied to the surge tank 58 through the ISA unit 50. The air in the surge tank 58 is then injected into a cylinder head 60. An ECU 64 controls the ISA system.

Such a conventional knock-preventing device including the ISA unit 50 suffers from a number of problems. For example, when a vehicle using the conventional ISA system climbs an uphill road and the driver suddenly depresses the accelerator pedal, the engine enters an off-idle state such as WOT (wide open throttle while idling). Consequently, the intake air flow is poor because the engine is at a lower (i.e., idling) rpm relative to the amount that of the throttle valve 52a is opened. Therefore, the air intake response is poor, and the fuel and air are not mixed properly. As a result, knocking occurs in the combustion chamber caused by partial explosion of air/fuel mixture (i.e., unstable combustion).

SUMMARY OF THE INVENTION

Accordingly, it is an object of the present invention to provide an improved method and device for preventing knocking during engine off-idle which eliminates the above problems encountered with conventional knock-preventing devices.

Another object of the present invention is to provide a method and device for preventing engine knock in a vehicle engine, including a control system which controls the opening and closing of a throttle valve during engine off-idle to effectively mix air and fuel. Thus, engine knock is prevented and EMS mapping can be accomplished without postponing spark timing, effectively improving the fuel and air ratio and the performance of the engine, and preventing knock during engine off-idle.

These and other related objects are achieved by providing a device for preventing knock in an engine, comprising: a throttle valve for controlling air flow to a combustion chamber of said engine via a first air flow passage; a throttle for controlling operation of the throttle valve; a detector for detecting an off-idle state of said engine; a disabling device for disabling control of the throttle valve by the throttle when the detector detects the off-idle state; and an idle speed actuator system for controlling air flow to said combustion chamber of said engine via a second air flow passage.

These and other objectives are also achieved by providing a method of preventing knock in an engine, comprising: (a) routing air flow to a combustion chamber of the engine via a first air flow passage using a throttle valve; (b) detecting an off-idle state of said engine; (c) stopping control of the throttle valve when said an off-idle state of the engine is detected; and (d) routing air flow to said combustion chamber of the engine via a second air flow passage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
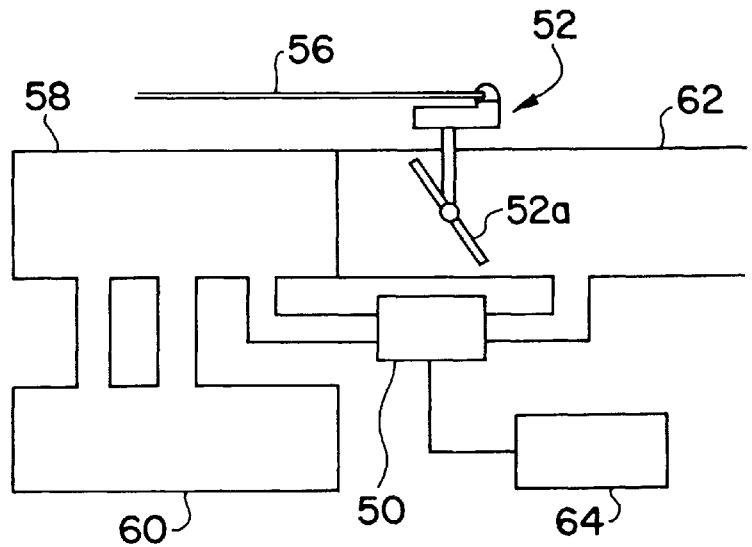
FIG. 1 is a partially diagrammatic top plane view of a conventional device for preventing knock upon off-idle of an engine of a vehicle.
Figure 2:
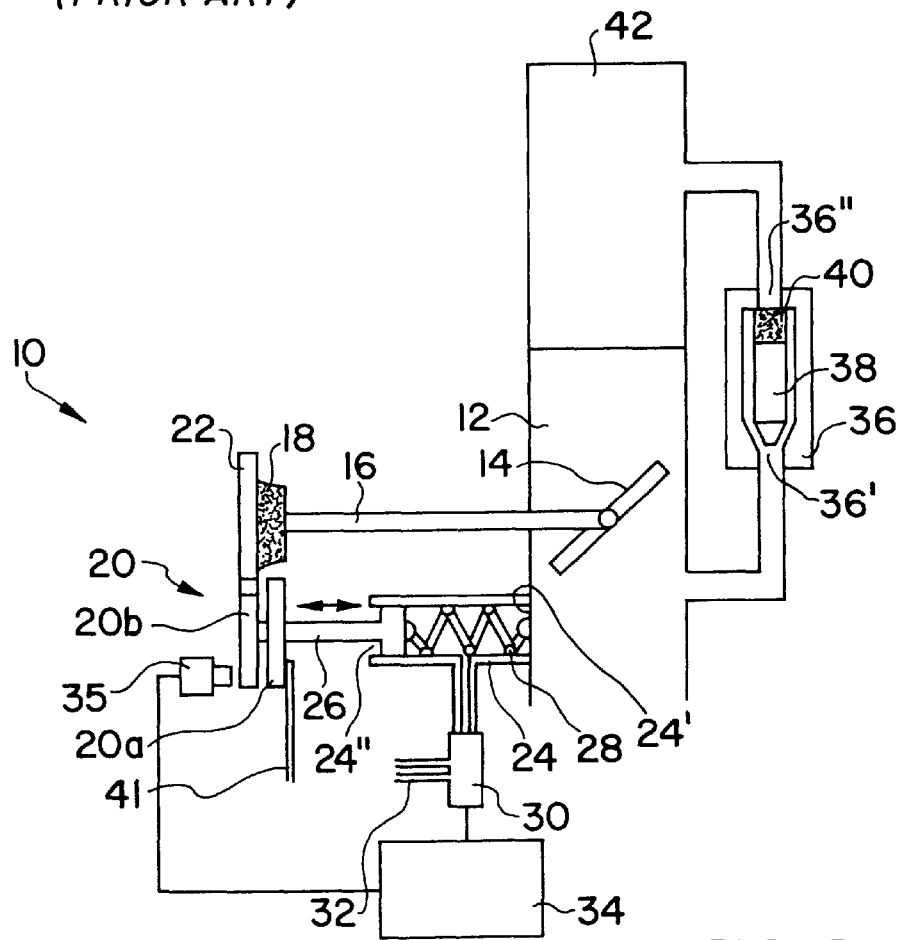
FIG. 2 is a top plane view of a device for preventing engine knock during engine off-idle of an engine of a vehicle according to the present invention.

Referring now in detail to the drawings for the purpose of illustrating preferred embodiments of the present invention, the device 10 for preventing engine knock during engine off-idle, as shown in FIG. 2, will be described. As shown in FIG. 2, the device 10 includes a hydraulic pressure actuator 24 adjacent to a throttle body 12, a solenoid valve 30 connected to the actuator 24, a first throttle 20 having a shaft part 26 movably inserted into the actuator 24, a biasing spring 28 for pulling the first throttle 20 in the same direction, a second throttle 22 selectively engageable with the first throttle 20, an ECU 34 operationally connected to the first throttle 20, and a variable idle speed actuator (hereinafter "ISA") unit 36.

The hydraulic pressure actuator 24, fluidically connected to the solenoid valve 30, as seen in FIG. 2, has a closed end 24' at the side of the throttle body 12 and an open end 24" at the side of the first throttle 20. The shaft part 26 of the first throttle 20 is adapted to be sealingly inserted into the open end 24" of the hydraulic pressure actuator 24, like a piston in a cylinder. The biasing spring 28 is connected to the end of the shaft part 26 disposed within the hydraulic pressure actuator 24. The other end of the biasing spring 28 disposed within the hydraulic pressure actuator 24 is connected to the closed end 24' of the actuator 24. The biasing spring 28 generally pulls the first throttle 20 towards the closed end 24' of the actuator 24.

The ECU 34 is connected to the solenoid valve 30, and detects whether or not the engine of a vehicle is in an idle state based on the rotating amount of the throttle shaft 26 of the first throttle 20. The throttle shaft 26 rotates in response to action of an axle cable 41 which operates in correspondence with rpm of the engine and the depression of the vehicle accelerator pedal (not shown). A rotation angle sensor 35 detects the amount the throttle shaft 26 rotates, and outputs a signal corresponding to this rotation amount to the ECU 34. Rotational angle sensor 35 may be conventional, such as a photo-sensitive eye or the like. If the ECU judges that the engine is in an off-idle state, then the ECU 34 places the solenoid valve 30 in an OFF-position. If the ECU 34 judges that the engine is not in an off-idle state, then the ECU 34 places the solenoid valve 30 in an ON-position.

In one embodiment of the present invention, the first throttle 20 may further comprise a first rotatable member 20a, such as a wheel, mounted on throttle shaft 26. Axle cable 41 is connected to the first rotatable member 20a in a manner such that it rotates in correspondence with a reciprocating action of the axle cable 41. As mentioned above, the axle cable 41 reciprocates in correspondence with the operating speed of the engine, which, in turn, corresponds to depression of the vehicle accelerator pedal (not shown).

First throttle 20 also includes a second rotatable member 20b (preferably in the form of a sprocket), which is also mounted on throttle shaft 26. For example, second rotatable member 20b is mounted on the opposite side of first rotatable member 20a, relative to actuator 24, as seen in FIG. 2. In view of this arrangement, therefore, second rotatable member 20b rotates whenever first rotatable member 20a is caused to rotate by the action of axle cable 41.

Second throttle 22 is also preferably in the form of a sprocket. The teeth (not shown here) of second rotatable member 20b and second throttle 22 are sized so as to be engageable with each other. Second throttle 22 is connected to a coil spring 18 whose rotational spring action acts about generally the same axis of rotation as that of second throttle 22. Coil spring 18 is also connected to throttle lever 16, which is in turn connected to throttle valve 14 disposed within throttle body 12. Coil spring 18 generally stabilizes the rotation of second throttle 22. Throttle valve 14 is arranged to selectively close off throttle body 12 when throttle valve 14 is actuated via throttle lever 16.

When solenoid valve 30 is in an OFF position (i.e., when the engine is judged to be in an off-idle condition), first throttle 20 is retracted under the biasing action of biasing spring 28. Accordingly, the teeth of second rotatable member 20b are disengaged from the teeth of second throttle 22, and the action of axle cable 41 does not cause actuation of throttle valve 14 (via first rotatable member 20a, second rotatable member 20b, second throttle 22, coil spring 18, and throttle lever 16).

When solenoid valve 30 is in an ON position (i.e., when the engine is judged to be not in an off-idle condition), pressure is raised within actuator 24 (for example, by increasing hydraulic pressure via hydraulic fluid port 32) and first throttle 20 is moved outwardly, against biasing spring 28, such that the teeth of second rotatable member 20b and second throttle 22 are placed in engagement with each other. Accordingly, throttle valve 14 is actuated in correspondence with the action of axle cable 41.

As described above, when the engine is in an off-idle state, the solenoid valve 30 is in an OFF-position, and the first throttle 20 is in an OFF-position state. Therefore, fresh air is supplied to the surge tank 42 through the variable ISA unit 36.

As shown in FIG. 2, the variable ISA unit 36 includes an air inlet 36' connected to the throttle body 12, and an air outlet 36" connected to the surge tank 42. A piston 38 selectively opens and closes the air inlet 36'. The piston 38 may have a tapered end, as seen in FIG. 2. A return spring 40 biases the piston 38 toward the air inlet 36' on the throttle body side. Therefore, depending on the air pressure in the surge tank 42, the piston 38 opens and closes the air inlet 36' to supply air to the surge tank 42 through the variable ISA unit 36. The anti-knock device 10, therefore, provides an ISA system which allows a proper amount of air to be provided to the surge tank 42 via air inlet 36'.

Because the present invention more effectively mixes air and fuel in an off-idle state of the engine, engine knock is prevented. Consequently, the spark timing does not need to be delayed (an alternative technique for preventing knock), and EMS mapping can be accomplished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for preventing knock in an engine having a combustion chamber and first and second airflow passages leading to the combustion chamber, respectively, the device comprising:

a throttle body defining the first airflow passage;

a throttle valve disposed in said throttle body for controlling air flow to the combustion chamber via the first airflow passage;

throttle means for controlling said throttle valve;

detecting means for detecting an off-idle state of the engine;

disabling means for disabling said controlling of said throttle valve by said throttle means when said detecting means detects said off-idle state; and an idle speed actuator unit located in the second airflow passage for controlling air flow to the combustion chamber via the second airflow passage, the second airflow passage being connected at one end to the combustion chamber and at a second end to said throttle body.

2. The device of claim 1, wherein said throttle means comprises:

a first rotatable member constructed and arranged to receive a mechanical input for controlling said throttle valve; and a second rotatable member selectively connected to said first rotatable member and to said throttle valve.

3. The device of claim 2, further comprising:

an axle cable constructed and arranged to provide said mechanical input to said first rotatable member in accordance with an operating speed of the engine.

4. The device of claim 2, wherein said disabling means disconnects the connection between said first and second rotatable members when said engine is in an off-idle state.

5. The device of claim 4, wherein said disabling means comprises:
   a solenoid valve connected to said detecting means having an on state and an off state; and
   an actuator connected to said solenoid valve and being constructed and arranged to move said first rotatable member so as to disconnect said first rotatable member from said second rotatable member in said off state of said actuator, and to move said first rotatable member so as to connect said first rotatable member with said second rotatable member in said on state of said actuator.

6. The device of claim 5, wherein said disabling means further comprises:
   a controller constructed and arranged to receive output from said detecting means and to control said solenoid valve based on said output from said detecting means, said controller placing said solenoid valve in said off state when said detecting means detects said off-idle state.

7. The device of claim 1, wherein said idle speed actuator system comprises:
   a piston; and
   biasing means for biasing said piston to close the second airflow passage.

8. The device of claim 7, wherein said biasing means comprises a resilient member connected to said piston.

9. The device of claim 7, wherein said biasing means biases said piston with a biasing force such that when air pressure on a throttle body side of the second airflow passage applies a force on said piston greater than said biasing force, said piston moves in response, thereby opening said second air flow passage.

10. A device for preventing knock in an engine having a combustion chamber and first and second airflow passages leading to the combustion chamber, comprising:
   a detector constructed and arranged to detect whether the engine is or is not in an off-idle state and to generate a detection signal corresponding to said detection of said off-idle state;
   a controller constructed and arranged to receive said detection signal from said detector and to generate a controlling signal corresponding to receipt of said detection signal;
   a solenoid valve constructed and arranged to receive said controlling signal from said controller, said controlling signal determining an ON/OFF state of said solenoid valve;
   an actuator connected to said solenoid valve, wherein said actuator operates in accordance with said ON/OFF state of said solenoid valve, said actuator having an open first end and a closed second end opposite said first end;
   a first throttle assembly comprising:
      a throttle shaft having an end slidably and rotatably disposed in said actuator via said open first end thereof;
      first and second rotatable members mounted on said throttle shaft;
   a second throttle assembly comprising a third rotatable member, wherein said second and third rotatable members are each constructed and arranged so as to be selectively engageable with each other, whereby a rotation of said second member causes said third member to rotate;
   a throttle body defining the first airflow passage;
   a throttle valve located in said throttle body and being constructed and arranged to control air flow to the combustion chamber via the first airflow passage, said second throttle being operationally connected to said throttle valve; and
   an idle speed actuator unit located in the second airflow passage and constructed and arranged to control air flow to the combustion chamber via the second airflow passage.

11. The device of claim 10, wherein said actuator is constructed and arranged to selectively move said first throttle assembly into and out of engagement with said second throttle assembly, in accordance with said ON/OFF state of said solenoid valve.

12. The device of claim 11, wherein said second member and said third member are each sprockets having intermeshable teeth.

13. The device of claim 12, wherein said second member and said third member lie in respective generally parallel planes, wherein said second member can move relative to said third member such that said teeth of said second member and said third member, respectively, intermesh.

14. The device of claim 11, wherein said solenoid valve is constructed and arranged to control a pressure within said actuator, wherein a variation in said pressure causes said selective movement of said first throttle assembly.

15. The device of claim 14, further comprising a hydraulic fluid pressure port connected, via said solenoid valve, to said actuator, wherein said solenoid valve is constructed and arranged to control a hydraulic pressure within said actuator.

16. The device of claim 10, further comprising an axle cable connected to said first member of said first throttle assembly at a first end and operationally connected to the engine at a second end, wherein said axle cable is arranged so as to reciprocate in correspondence with a speed of the engine, said reciprocation driving said first member in rotation.

17. The device of claim 11, wherein said actuator comprises a resilient biasing member constructed and arranged to bias said second member in a direction away from engagement with said third member.

18. The device of claim 11, wherein said resilient biasing member is a spring member connected to said first throttle assembly at one end and to said actuator at a second end thereof.

19. The device of claim 10, wherein said idle speed actuator unit comprises:
   a piston; and
   biasing means for biasing said piston so as to close off the second airflow passage.

20. The device of claim 19, wherein said biasing means biases said piston with a biasing force such that when air pressure on a throttle body side of the second airflow passage applies a force on said piston greater than said biasing force, said piston moves in response, thereby opening said second airflow passage.

21. The device of claim 19, wherein said biasing means comprises a resilient member connected to said piston.

22. A method of preventing knock in an engine having a combustion chamber and first and second airflow passages leading to the combustion chamber, comprising:
   controlling air flow to the combustion chamber of the engine via the first air flow passage using a throttle valve;

detecting an off-idle state of the engine;

excluding said controlling step from controlling the throttle valve when said detecting step detects said off-idle state; and controlling air flow to said combustion chamber of the engine via the second air flow passage.

23. The method of claim 22, wherein said controlling step comprises controlling operation of a first throttle assembly, the first throttle assembly being selectively connected to a second throttle assembly, and the second throttle assembly being operationally connected to the throttle valve.

24. The method of claim 23, wherein said excluding step comprises disconnecting the operational connection between the first and second throttle assemblies.

* * * * *